(12) United States Patent
Schulz et al.

(10) Patent No.: US 10,941,305 B2
(45) Date of Patent: Mar. 9, 2021

(54) THERMOPLASTIC SCREEN PRINTING PASTE

(71) Applicant: Ferro GmbH, Frankfurt am Main (DE)

(72) Inventors: Andreas Schulz, Karben (DE); Elisabeth Gross, Frankfurt (DE)

(73) Assignee: Ferro Corporation, Mayfield Heights, OH (US)

( * ) Notice: Subject to any disclaimer, the term of this patent is extended or adjusted under 35 U.S.C. 154(b) by 224 days.

(21) Appl. No.: 15/780,857

(22) PCT Filed: Dec. 1, 2016

(86) PCT No.: PCT/EP2016/079419
§ 371 (c)(1),
(2) Date: Jun. 1, 2018

(87) PCT Pub. No.: WO2017/102351
PCT Pub. Date: Jun. 22, 2017

(65) Prior Publication Data
US 2018/0362783 A1    Dec. 20, 2018

(30) Foreign Application Priority Data

Dec. 16, 2015 (DE) .................... 10 2015 122 034.2

(51) Int. Cl.
*C09D 11/102* (2014.01)
*B41M 1/12* (2006.01)
(Continued)

(52) U.S. Cl.
CPC ............ *C09D 11/102* (2013.01); *B41M 1/12* (2013.01); *B41M 1/34* (2013.01); *C09D 11/037* (2013.01);
(Continued)

(58) Field of Classification Search
CPC ......... B41M 1/12; B41M 1/34; C09D 11/037; C09D 11/08; C09D 167/00; C09D 175/04; C09D 11/102
(Continued)

(56) References Cited

U.S. PATENT DOCUMENTS 3,872,044 A   3/1975   Hervey et al.
4,007,154 A   2/1977   Schimmel et al.
(Continued)

FOREIGN PATENT DOCUMENTS

EP   0936238 A1   8/1999
JP   6131185      5/2017
(Continued)

OTHER PUBLICATIONS

Stepan Company, "Rucote 102", Jan. 2016 (Year: 2016).*
(Continued)

*Primary Examiner* — David T Karst
(74) *Attorney, Agent, or Firm* — Rankin, Hill & Clark, LLP; Christopher Jan Korff

(57) ABSTRACT

The present invention relates to a thermoplastic screen printing paste comprising
one or more hydroxyfunction polyesters,
one or more blocked polyisocyanates,
pigments, and
additives.
The invention is characterized in that the melting or softening range of the thermoplastic screen printing paste lies at temperatures below 90° C. and the paste is free of bisphenol-A is and free of other substances directly involved in the polymerization itself.

20 Claims, 1 Drawing Sheet

Temperature dependence of the viscosity of polyesterpolyols at a constant shear rate of 10 s$^{-1}$ in a temperature range between 70° C and 110° C.

(51) Int. Cl.
*C09D 11/037* (2014.01)
*C09D 11/08* (2006.01)
*B41M 1/34* (2006.01)
*C09D 167/00* (2006.01)
*C09D 175/04* (2006.01)

(52) U.S. Cl.
CPC ............ *C09D 11/08* (2013.01); *C09D 167/00* (2013.01); *C09D 175/04* (2013.01)

(58) Field of Classification Search
USPC ....................................................... 523/160
See application file for complete search history.

(56) References Cited

U.S. PATENT DOCUMENTS

| | | | |
|---|---|---|---|
| 5,202,162 | A | 4/1993 | Hart, Jr. et al. |
| 5,346,933 | A | 9/1994 | Knell |
| 5,549,929 | A | 8/1996 | Scheibelhoffer et al. |
| 5,880,209 | A | 3/1999 | Patzschke et al. |
| 6,077,563 | A | 6/2000 | Kapp et al. |
| 6,105,502 | A | 8/2000 | Wagner et al. |
| 6,214,414 | B1 | 4/2001 | Tang et al. |
| 8,816,012 | B2 | 8/2014 | Brown et al. |
| 8,889,778 | B2 | 11/2014 | Duraisamy |
| 2002/0019459 | A1 | 2/2002 | Albrecht et al. |
| 2002/0151630 | A1 | 10/2002 | Steinhausler et al. |
| 2006/0191625 | A1 | 8/2006 | Kapp et al. |
| 2015/0210885 | A1 | 7/2015 | Rhoades et al. |
| 2015/0299478 | A1* | 10/2015 | Sente .................... C09D 11/52 174/268 |

FOREIGN PATENT DOCUMENTS

| | | | | |
|---|---|---|---|---|
| WO | WO-2015046096 | A1 * | 4/2015 | .............. H01B 1/22 |
| WO | 2015046096 | A1 | 3/2017 | |

OTHER PUBLICATIONS

Sakamoto et al., WO 2015/046096 A1 machine translation in English, Apr. 2, 2015 (Year: 2015).*

Espacenet bibliographic data for JP6131185 published May 17, 2017, one page.

Espacenet bibliographic data for JPWO2015046096 published Mar. 9, 2017, one page.

International Search Report for corresponding PCT/EP2016/079419 dated Feb. 10, 2017, two pages.

* cited by examiner

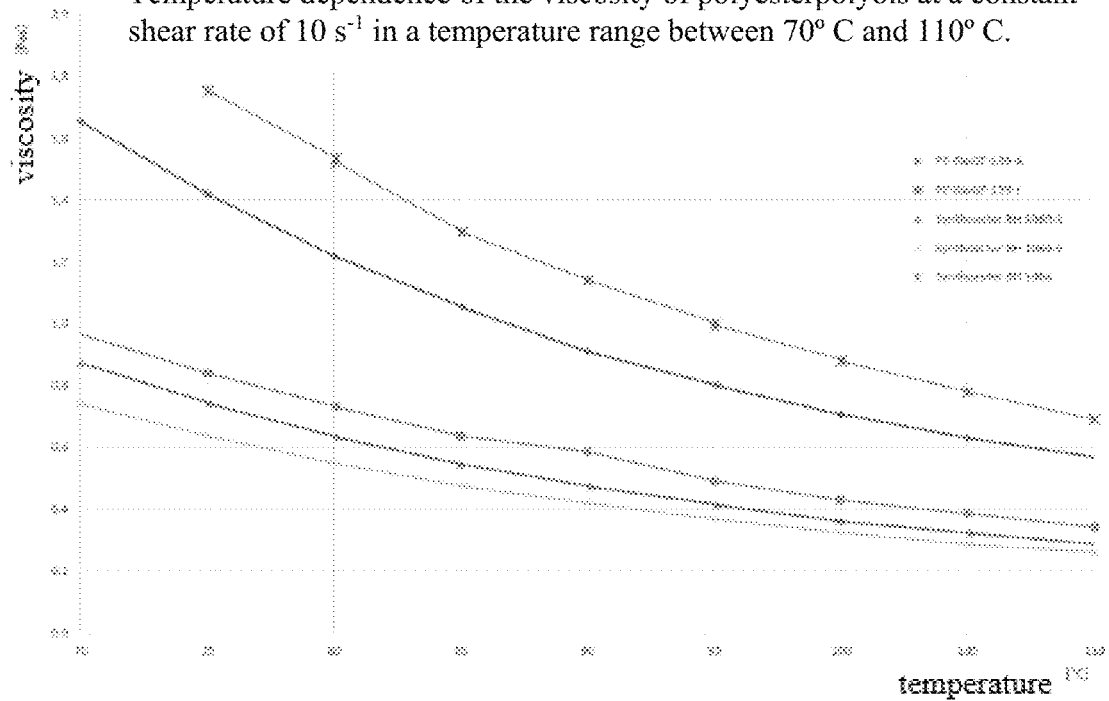
Temperature dependence of the viscosity of polyesterpolyols at a constant shear rate of 10 s$^{-1}$ in a temperature range between 70° C and 110° C.

THERMOPLASTIC SCREEN PRINTING PASTE

FIELD OF THE INVENTION

The present invention relates to a thermoplastic screen printing paste for the decoration of glass. Moreover, the present invention relates to the preparation thereof, on a substrate, imprinted with the thermoplastic screen printing paste, to the method of preparation of the screen printing paste and the substrate imprinted with the thermoplastic screen printing paste and to the use of the thermoplastic screen printing paste according to the invention.

PRIOR ART

There are many documents in the prior art which describe thermoplastic screen printing inks.

U.S. Pat. No. 6,077,563 describes a method for the decorating of a substrate, involving: preparing of a heat-hardening coating composition, comprising a reactive polymer binder and around 20 to around 80 wt. % of a crystalline cross-linking agent, wherein the coating composition is substantially free of diluents; heating the coating composition to a first temperature below a hardening temperature of the coating composition at which the coating composition is fluid and the crystalline cross-linking agent is substantially inactive; applying the heated coating composition to a substrate, wherein the applied coating composition is sufficiently cooled down so that it hardens at least partly; and heating the applied coating composition to a second temperature above the first temperature for a sufficient period of time to activate the crystalline cross-linking agent and cool the coating composition.

The reactive polymer binder comprises at least one resin, chosen from the group comprising acrylic resins, epoxides, polyesters and urethanes. The crystalline cross-linking agent comprises at least one material chosen from the group comprising tetramethoxymethylglycoluryl and isocyanurates. The indicated cross-linking agents have high melting points. Accordingly, the substances are heated in a temperature of 80 to around 130° C., at which they become fluid and can be applied by screening. The hardening of the cooled layer occurs in a temperature range of 170° C. to 240° C.

EP 0 604 815 A2 describes a thermoplastic screen printing method based on a mixture of epoxy resins and a hardening agent. The epoxy resin used is resins based on bisphenol A. The use of bisphenol A is seen as being critical, since bisphenol A presumably has influence on fertility. In the food industry, the limit value for BPA has once again been lowered significantly.

U.S. Pat. No. 5,549,929 describes a method for the decorating of a substrate involving the following steps:
A. Preparation of a coating composition, comprising
   I) a polymer binder, having a hydroxyfunctional material (I) and a cross-linker, wherein the polymer binder makes up around 20% to around 80 wt. % of the mentioned hydroxyfunctional material;
   II) at least one crystalline reactive diluent (III), wherein the crystalline reactive diluent comprises a crystalline material which can form a chemically covalent bond with at least one of the hydroxyfunctional material or the cross-linker,
B. heating of the coating composition to a temperature of around 70° C. to around 160° C.,
C. applying the coating composition to a substrate by means of screen pressure, in order to imprint at least one segment of the substrate;
D. cooling of said applied coating composition in order to solidify the coating composition and
E. heating the coating composition to a temperature of around 150° C. to around 250° C. in order to harden the coating composition.

In the description of the examples, hydrogenated bisphenol A is mentioned as the crystalline reactive diluent.

WO 2005/012199 A1 discloses a hardenable composition comprising at least one hardenable organic binder and a multitude of particles which are rigid at or below a first temperature and which soften at a second temperature at or below which the binder hardens. Polyepoxy-functional reactive resin is mentioned as the hardenable organic binder.

And finally U.S. Pat. No. 6,214,414 describes a method for the coating of a ceramic substrate (glass) by means of plastic screening, wherein several layers are printed. Each of the coating compositions comprises
   an organic resin, which is polyhydroxyfunctional, polyepoxy-functional, or both,
   a reactive wax
   pigment and
   a blocked polyisocyanate, wherein
   the coating composition of at least one coating of a layer is substantially free of an amino-functional hardening agent and the coating composition of at least one coating of another layer comprises an amino-functional hardening agent in order to cross-link the pigmented coating compositions. The temperatures for the hardening are 150° C. to 200° C.

U.S. Pat. No. 5,202,162 describes a thermoplastic screening based on an ethylene homopolymer, a copolymer based on ethylene and an ethylenically unsaturated polymer. U.S. Pat. No. 3,872,044 likewise describes a thermoplastic screening based on a polyamide resin, plasticizer and pigment. No thermal cross-linking takes place in either of the two cited documents.

In more recent time, there is a growing effort to develop polymers based on renewable raw materials. These polymers are also called biopolymers. The ecological compatibility of the produces is paid much attention, especially in terms of sustainability.

Problem

The problem which the invention proposes to solve is to provide an environmentally friendly thermoplastic screen printing paste which is easy to prepare and furthermore also economical.

The thermoplastic screen printing paste should also harden quickly after being applied to a substrate, so that it is possible to apply a further ink.

DETAILED DESCRIPTION OF THE INVENTION

Surprisingly, it has been possible to solve this problem by preparing a thermoplastic screen printing paste comprising
   one or more hydroxyfunctional polyesters,
   one or more blocked polyisocyanates,
   pigments, and
   additives, and
characterized in that the melting or softening range of the thermoplastic screen printing paste lies at temperatures below 90° C. and the paste is free of bisphenol-A and free of other substances directly involved in the polymerization itself.

By substances directly involved in the polymerization itself is meant, for example, substances which reduce the viscosity, i.e., so-called reactive diluents. As reactive diluents, one uses mono-, bi- or polyfunctional monomers or oligomers with low viscosity. In addition, cross-linking agents are also substances directly involved in the polymerization itself. In the prior art there are plenty of documents on reactive diluents and cross-linking agents to which the skilled person has access.

It has been discovered that the polymerization process without other substances directly involved in the polymerization itself, i.e., without reactive diluents and without cross-linking agents, produces polymers with especially desirable properties in combination with pigments in terms of the coloration of the paste imprinted on the substrate. This technique also has an ecological background, namely, the sparing of needless chemical additives, so that one may restrict it to the few absolutely essential chemical starting materials yet still achieve valuable products from it.

The individual components in the thermoplastic screen printing paste are present in the following range of percent by weight:

| | |
|---|---|
| one or more hydroxyfunctional polyesters: | 20-80 wt. % |
| one or more blocked polyisocyanates: | 10-50 wt. % |
| pigments | 5-40 wt. % |
| additives, each one | 0-10 wt. % |

Preferably, hydroxyfunctional polyesters are used in a range of 30-75 wt. %, more preferably in a range of 35-70 wt. % and even more preferably in a range of 40-65 wt. %.

Blocked polyisocyanates are preferably used in a range of 15-40 wt. % and more preferably in a range of 20-30 wt. %.

It is most especially preferred for hydroxyfunctional polyesters to be present in a range of 40-65 wt. % and blocked polyisocyanates in a range of 20-30 wt. %.

The one or more hydroxyfunctional polyesters are compounds made from renewable raw materials.

These include compounds of renewable raw materials chosen from the group containing castor oil, sugar, glycerine, grapeseed oil, peanut oil, sesame oil, rapeseed oil, walnut oil, wheat germ oil, macadamia nut oil, tapioca oil, cottonseed oil, soybean oil, sunflower oil, linseed oil, corn and corn oil.

Preferably, the one or more hydroxyfunctional polyesters are based on sebacic acid and succinic acid and butane diols, chosen from the group containing 1,2-butane diol, 1,3-butane diol, 1,4-butane diol and 2,3-butane diol; propane diols such as 1,2-propane diol, 1,3-propane diol; and cyclical diols, such as 1,4-cyclohexane dimethanol; pentane diols, such as 1,5-pentane diol and hexane diols, such as 1,6-hexane diol.

The one or more blocked polyisocyanates are chosen from the group consisting of HDI, IPDI, PDI, TDI, MDI and CHDI. The blocking agents are for example triazoles, diethylmalonate, caprolactams, dimethylpyrazole, diisopropylamine, methylethylketoxime or other oximes.

It is especially preferred that the one or more hydroxyfunctional polyesters are based on sebacic acid and 1,4-butane diol and the one or more blocked polyisocyanates are based on HDI.

The thermoplastic screen printing paste may further contain other additives in order to improve properties such as flow, chemical and mechanical resistance, or to increase the Erichsen hardness. These include additives chosen from the group consisting of adhesion promoters, flow agents, rheology agents, defoamers, antipopping additives, dispersant additives, resins, thixotropic agents, polyisocyanates of various types, optionally being unblocked.

The additives are present in a quantity of 0-10 wt. %, in terms of the total weight of the screen printing paste.

The pigments which can be used are ordinary inorganic or organic pigments. Depending on the desired color hue, the pigments are present in a quantity of 5-40 wt. %, in terms of the total weight of the screen printing paste. The most varied color hues are possible by the use of organic and/or inorganic pigments.

A further subject matter of the invention is a substrate which is imprinted with the thermoplastic screen printing paste according to the invention.

The substrate is preferably a glass, but other objects such as porcelain, ceramic or earthenware may also be imprinted with the thermoplastic screen printing paste according to the invention.

A further subject matter of the present invention is a method for making the thermoplastic screen printing paste, characterized by the following steps:
  preparing of one or more hydroxyfunctional polyesters,
  adding of one or more blocked polyisocyanates, pigments and additives, and
  melting at a temperature in the range of 70-90° C., dispersing and homogenizing.

The method for making the substrate imprinted with the thermoplastic screen printing paste is characterized by the following steps:
  a) printing of the thermoplastic screen printing paste according to claim 12 at a temperature in the range of 60-85° C. onto a substrate, wherein the ink solidifies immediately after being printed on the cooled substrate, and
  b) optional repeating of step a) to apply further inks to the substrate, and
  c) tempering of the imprinted substrate for 5-30 minutes at 140-250° C.

The paste is solid at room temperature. For the printing, the paste is melted. Thanks to the use of dissolved polyisocyanate, it is possible to do the printing at a temperature in the range of 60-85° C. This results in energy savings. There is also less load on the screen, so that it can be used longer. When the fluid paste is applied by screening on a glass, the paste solidifies on the cold glass. Thus, several inks can be printed in succession. After the printing process, the imprinted glass is tempered in the oven at a temperature between 140-250° C. for a few minutes. A further cross-linking takes place, which means that the blocked polyisocyanates become unblocked at higher temperatures and react with the hydroxy groups to form polyurethanes.

A further subject matter of the invention is the use of the thermoplastic screen printing paste for the decoration of substrates. The substrate is preferably a glass.

The invention shall be further described with the aid of examples, which will not limit the invention.

EXAMPLES

The following trials were carried out with trial numbers EG9/15, EG141/15, EG144/15, EG146/15, EG167/15. The following table indicates the quantities used and the physical properties. The values for cross cut and Erichsen hardness pertain to the printed ink hardened at the indicated temperature:

|  | Trial number | | | | |
| --- | --- | --- | --- | --- | --- |
|  | EG9/15 | EG141/15 | EG144/15 | EG146/15 | EG167/15 |
| Bio-polyester polyol: PE-BioGT-139A | 47.5 | | | | |
| Bio-polyester polyol: BH 1060-5 | | 60.1 | 58.4 | 61 | |
| Bio-polyester polyol: | | | | | 67.2 |
| Titanium dioxide | 29.4 | | | | |
| Color Index: Pigment Green 7 | | | 12.9 | | |
| Color Index: Pigment Violet 19 | | 10.7 | | | 10.7 |
| Color Index: Pigment Violet 23 | | | | 9.4 | |
| Blocked isocyanate | 21.1 | 27.2 | 26.4 | 27.6 | 20.1 |
| OH/NCO | 1:1 | 1:1.2 | 1:1.2 | 1:1.2 | 1:1.2 |
| Adhesion promoter (silane) | 2 | 2 | 2.3 | 2 | 2 |
| Total of ingredients | 100 | 100 | 100 | 100 | 100 |
| Viscosity [Pas]/200 s−1/75° | 4.07 | 1.32 | 1.23 | 1.26 | n. b. |
| Printing temperature | 70° C. | 80° C. | 75° C. | 75° C. | 80° C. |
| Hardening | 200° C./10 min | 160° C./20 min | 160° C./20 min | 160° C./20 min | 160° C./20 min |
| Cross cut | 0-1 | 1 | 1 | 0-1 | 0-1 |
| Erichsen hardness | 9 N | 5 N | 4 N | 5.5 N | 6 N |
| Color | white | red | green | violet | red |

The polyester polyols used each time were a dihydroxypolyester based on sebacic acid and 1,4-butane diol.

The difference between PE-BioGT-139A and synthoester BH 1060-5 can be explained as follows: PE-BioGT-139A was produced on a scale of around 500 g, PE-BioGT-139J (only the viscosity being measured here, see FIG. 1) is the repetition. The polyester polyols denoted as synthoester were produced on a scale of 1 kg and 5 kg. Synthoester BH 1060-5 and synthoester 1064-5 differ only in a different grade of the sebacic acid used. However, the polyester polyols differ slightly in their OH numbers and acid numbers:

| Compound | Acid number [mg KOH/g] | OH number [mg KOH/g] |
| --- | --- | --- |
| PE-BioGT-139A | 4 | 66 |
| PE-BioGT-139J | 3 | 61 |
| Synthoester BH 1060-1 | 2.3 | 59 |
| Synthoester BH 1060-5 | not determined | 56 |
| Synthoester BH 1064-5 | 2.3 | 38 |

EXPERIMENTAL PROCEDURE

The trial with trial number E9/15 shall now be explained. PE-BioGT-139A is melted with a HDI-polyisocyanate (75% in solvent naphtha) at 75° C., reacted with titanium dioxide and an organosilane, dispersed and homogenized by means of a heated roller mill. The screen printing paste was heated to 70° C. and printed at this temperature by means of heated steel screen (270 mesh per inch) onto glass. Since the ink solidifies on the cold glass, it is possible to print further colors. After this, the imprinted glass is hardened for 10 min in the oven at 200° C.

The other trials were conducted in similar fashion with the compounds and conditions mentioned in the table.

FIG. 1 shows the viscosity curves of the polyester polyols.

The invention claimed is:

1. A thermoplastic screen printing paste comprising
one or more hydroxy-functional polyesters,
one or more blocked polyisocyanates, and
pigments,
wherein the paste is solid at room temperature and the paste is free of bisphenol-A and the paste is free of reactive diluents and cross-linking agents.

2. The thermoplastic screen printing paste of claim 1, wherein the individual components are present in the following range of percent by weight:

| one or more hydroxy-functional polyesters: | 20-80, |
| --- | --- |
| one or more blocked polyisocyanates: | 10-50, |
| pigments | 5-40, | and wherein the thermoplastic screen printing paste further comprises one or more additives at 0-10 wt. %.

3. The thermoplastic screen printing paste of claim 1 wherein the one or more hydroxy-functional polyesters are based on (a) sebacic acid and (b) succinic acid and (c) at least one selected from the group consisting of butane diols, 1,2-butane diol, 1,3-butane diol, 1,4-butane diol, 2,3-butane diol; propane diols, 1,2-propane diol, 1,3-propane diol; cyclic diols, 1,4-cyclohexane dimethanol, pentane diols, 1,5-pentane dial, hexane diols, and 1,6-hexane dial.

4. The thermoplastic screen printing paste of claim 3, wherein the additives are chosen from the group consisting of adhesion promoters, flow agents, rheology agents, defoamers, antipopping additives, dispersant additives, resins, thixotropic agents and unblocked polyisocyanates.

5. A substrate imprinted with the thermoplastic screen printing paste of claim 3.

6. A method for imprinting a glass substrate with a thermoplastic screen printing paste comprising:
a) printing of the thermoplastic screen printing paste of claim 3 at a temperature in the range of 60-85° C. onto a substrate, wherein the paste solidifies immediately after being printed on the cooled substrate, and b) optional repeating of step a) to apply other paints to the substrate, and c) tempering of the imprinted substrate for 5-30 minutes at 140-250° C.

7. The thermoplastic screen printing paste of claim 2, wherein the one or more hydroxy-functional polyesters are based on sebacic acid and 1,4-butane diol and the one or more blocked polyisocyanates are based on hexamethylene diisocyanate (HDI).

8. The thermoplastic screen printing paste of claim 2, wherein the additives are chosen from the group consisting of adhesion promoters, flow agents, rheology agents, defoamers, antipopping additives, dispersant additives, resins, thixotropic agents and unblocked polyisocyanates.

9. The thermoplastic screen printing paste of claim 1, wherein the one or more hydroxy-functional polyesters are compounds made from renewable raw materials.

10. The thermoplastic screen printing paste of claim 9, wherein the renewable raw materials are selected from the group consisting of castor oil, sugar, glycerine, grapeseed oil, peanut oil, sesame oil, rapeseed oil, walnut oil, wheat germ oil, macadamia nut oil, tapioca oil, cottonseed oil, soybean oil, sunflower oil, linseed oil, corn and corn ail.

11. The thermoplastic screen printing paste of claim 10, wherein the one or more blocked polyisocyanates are selected from the group consisting of hexamethylene diisocyanate (HDI), isophorone diisocyanate (IPDI), pentamethylene diisocyanate (PDI), toluene diisocyanate (TDI), methylene diphenyl diisocyanate (MDI), 1,4-cyclohexyl diisocyanate (CHDI).

12. The thermoplastic screen printing paste of claim 11, wherein the one or more hydroxy-functional polyesters are based on sebacic acid and 1,4-butane diol and the one or more blocked polyisocyanates are based on hexamethylene diisocyanate (HDI).

13. The thermoplastic screen printing paste of claim 1, wherein the one or more hydroxy-functional polyesters are based on (a) sebacic acid and (b) succinic acid and (c) at least one selected from the group consisting of butane diols, 1,2-butane diol, 1,3-butane diol, 1,4-butane diol, 2,3-butane dial; propane dials, 1,2-propane diol, 1,3-propane diol; cyclic diols, 1,4-cyclohexane dimethanol, pentane diols, 1,5-pentane diol, hexane dials, and 1,6-hexane diol.

14. The thermoplastic screen printing paste of claim 13, wherein the one or more blocked polyisocyanates are selected from the group consisting of hexamethylene diisocyanate (HDI), isophorone diisocyanate (IPDI), pentamethylene diisocyanate (PDI), toluene diisocyanate (TDI), methylene diphenyl diisocyanate (MDI), 1,4-cyclohexyl diisocyanate (CHDI).

15. The thermoplastic screen printing paste of claim 14, wherein the one or more hydroxy-functional polyesters are based on sebacic acid and 1,4-butane diol and the one or more blocked polyisocyanates are based on hexamethylene diisocyanate (HDI).

16. The thermoplastic screen printing paste of claim 1, wherein the one or more blocked polyisocyanates are selected from the group consisting of hexamethylene diisocyanate (HDI), isophorone diisocyanate (IPDI), pentamethylene diisocyanate (PDI), toluene diisocyanate (TDI), methylene diphenyl diisocyanate (MDI), 1,4-cyclohexyl diisocyanate (CHM).

17. The thermoplastic screen printing paste of claim 16, wherein the one or more hydroxy-functional polyesters are based on sebacic acid and 1,4-butane diol and the one or more blocked polyisocyanates are based on hexamethylene diisocyanate (HDI).

18. A substrate imprinted with the thermoplastic screen printing paste of claim 1.

19. The substrate of claim 18, wherein the substrate is glass.

20. A method for making the thermoplastic screen printing paste of claim 1, comprising:
preparing one or more hydroxy-functional polyesters,
adding one or more blocked polyisocyanates and pigments and optionally additives, to form a mixture and
melting the mixture at a temperature in the range of 70-90° C., dispersing and homogenizing.

\* \* \* \* \*